United States Patent [19]

Metzler

[11] Patent Number: 4,932,025
[45] Date of Patent: Jun. 5, 1990

[54] METHOD OF INFORMATION TRANSFER AS WELL AS AN ARRANGEMENT FOR IMPLEMENTING THE METHOD

[75] Inventor: Ernst Metzler, Bremerhaven-W., Fed. Rep. of Germany

[73] Assignee: U.S. Philips Corporation, New York, N.Y.

[21] Appl. No.: 263,099

[22] Filed: Oct. 26, 1988

[30] Foreign Application Priority Data

Oct. 28, 1987 [DE] Fed. Rep. of Germany ....... 3736466

[51] Int. Cl.⁵ .......................................... H04J 3/02
[52] U.S. Cl. ............................. 370/85.15; 340/825.05
[58] Field of Search ..................... 370/15, 16, 85, 86, 370/87, 89, 94, 95, 112, 24, 110.4, 85.5, 85.15, 85.7, 95.1; 340/825.05

[56] References Cited

U.S. PATENT DOCUMENTS

| | | | |
|---|---|---|---|
| 4,498,168 | 2/1985 | Tseng | 370/88 |
| 4,516,236 | 5/1985 | Hadziomerovi | 370/24 |
| 4,538,263 | 8/1985 | Gabrielli et al. | 370/87 |
| 4,723,241 | 2/1988 | Grobel et al. | 371/11 |

Primary Examiner—Robert L. Griffin
Assistant Examiner—Wellington Chin
Attorney, Agent, or Firm—Anne E. Barschall; Jack E. Haken

[57] ABSTRACT

The invention relates to a transfer arrangement comprising a plurality of stations that are connected to each other via separate write lines and read lines, the write line at one position being coupled to the read line. The information transfer from one station to another is effected through a data channel that is formed by an allocated time slot in periodic frames. In order to realize an improved use of the data channel in the case of mutually simultaneous information exchange between two stations, according to the invention only one data channel is occupied through which each station reversibly links the information arriving through the incoming write line to the information to be transferred, preferably by means of an exclusive OR gate, and in addition, each station links the received information again to the transferred information, thus recovering the information transferred by the other station.

8 Claims, 1 Drawing Sheet

4,932,025

METHOD OF INFORMATION TRANSFER AS WELL AS AN ARRANGEMENT FOR IMPLEMENTING THE METHOD

BACKGROUND OF THE INVENTION

The invention relates to a method and apparatus for information transfer between two or more stations, which are all connected to each other for serial data transfer by means of a write line and a read line separated from the write line. The write line, after passing through all the stations, is connected to the read line at the end. A time frame structure is formed by periodic synchronizing information stored at the beginning of the write line. The frame structure comprises various data words which each form a data channel at the same position in successive frame.

Such a method is, for example, Known from the German Patent Application DE-OS 34 27 981. Each occupied data channel represents a connection from one station to another, that is to say information is only transferred from the one station to the other each time.

However, two stations are often connected to each other such that they exchange information, specifically, the second station simultaneously transfers information back to the first station. This is usually effected through a second data channel. Consequently, for simultaneous mutual information exchange between two stations also two data channels are required, so that with a limited number of data channels the number of stations, that are able to simultaneously transfer information, is limited too.

It is an object of the invention to provide a method of the type mentioned in the preamble, that utilizes the individual data channels more effectively and therefore enables more connections between stations.

SUMMARY OF THE INVENTION

For enabling simultaneous information transfer between two stations through the same channel, at each of these two stations the information arriving through the incoming write line is reversibly linked to its own information to be transferred, and the result of the linkage is transferred back through the outgoing write line, while its own information to be transferred is buffered and the information received through the read line is linked to its own stored information, in order to receive the information to be transferred from the other station.

In this way a combination of the information of the two stations is transferred to the second station through the write line seen in the direction of the transfer, which information is then successively led back to the two stations via the read line, while each station can then recover the transferred information from the other station, as its information is still stored therein and is thus available and can be removed again as it were from the linked information.

The method according to the invention resembles to a certain extent the encoded information transfer, in which the information to be transferred is linked to a predetermined code information and transferred to the receiver, where this code information is also known, so that the useful information to be received can be recovered from the encoded information. With the method according to the invention, however, there is no linkage to a predetermined code information, but to the useful information arriving each time, so that it is possible in a surprisingly simple manner to use a single data channel two times, that is to say, for the information transfer between two stations in both directions.

A reversible linking of two information streams can be effected in various ways. An especially simple realisation according to an embodiment of the invention consists of the fact that the linking arrangement is an exclusive OR gate. Consequently, the use of the same gate both for the write line and the read line is possible.

An arrangement for implementing the method according to the invention is characterized in that at each station the incoming write line is connected to an input of a first linking arrangement, whose second input is connected to a source of its own information to be transferred, and whose output feeds the outgoing write line, and in that at each station the read line is connected to an input of a second linking arrangement whose second input via a memory is connected to the source of its own information to be transferred, and whose output furnishes the information to be transferred by the other station. A simple realisation of the linking arrangement according to a further embodiment of the invention is characterized in that the first and the second linking arrangements are exclusive OR gates.

BRIEF DESCRIPTION OF THE DRAWINGS

Embodiments of the invention will be further explained with reference to the drawing shown hereinafter, in which.

DESCRIPTION OF THE PREFERRED EMBODIMENTS

Figure 1:
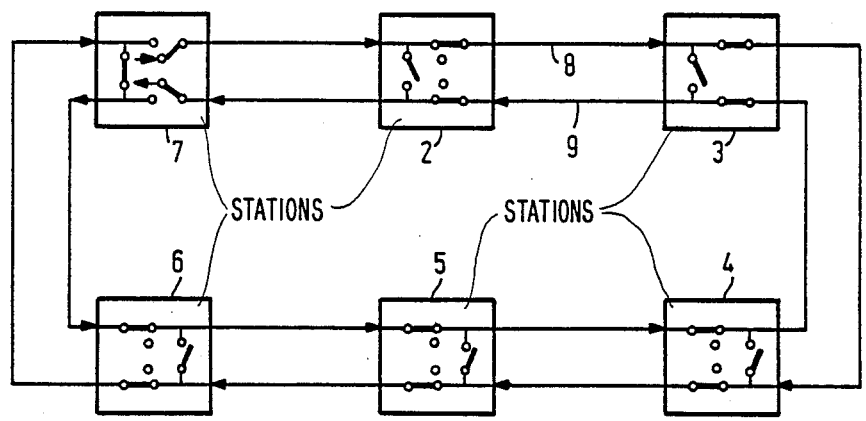
FIG. 1 shows a transfer system with a plurality of stations which are connected to each other via separate write lines and read lines.

In FIG. 1 a number of stations 2 to 7 are connected to each other via a write line 8 and a read line 9. Both the write line and the read line in the simplest case consist of a single wire or also a simple transfer path of an optical conductor, through which the data are transferred entirely in the serial mode. At the stations 2 to 7 only the major components in the transfer path are shown, that is to say two change-over switches in the transfer path of each of the two lines 8 and 9 as well as a switch that can connect the two lines. At the station 7 the two conductors are really connected to each other and the change-over switch for the write line 8 is connected to a generator (not shown) for producing synchronizing information for the time frame structure on the write line 8, while the read line 9 at the station 7 is connected to a terminal. In addition, at each station the write line 8 is connected to an information transfer arrangement and the read line 9 to a receive arrangement for reading the information. When a station transfers information through a data channel over the write line 8, within the frame structure, this information passes through all the stations until at station 7 it is switched onto the read line and then again passes through all the stations including the station from which it was transferred. With prior art addressing and allocating methods each station can thus transfer information to each further station.

If it is assumed that, for example, the two stations 2 and 3 wish to exchange information with each other simultaneousy, the station 2 can transmit a data word through a data channel on the write line 8, and the station 3 can transfer a data word through another data channel. Both data words now pass through the stations 4, 5 and 6 over the write line 8 and are coupled at station 7 onto the read line 9 so that the transferred data words again pass through the stations 6, 5 and 4 and are finally received at the station 3 or 2, respectively.

Figure 2:
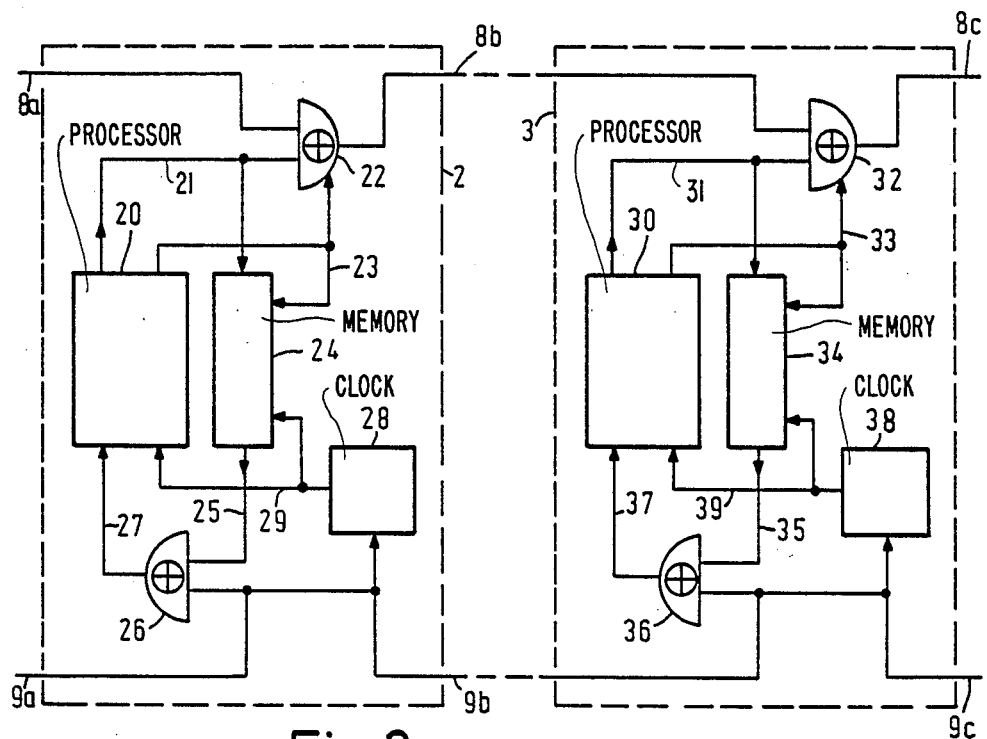
FIG. 2 shows the essential part of the inner structure of two stations taken as an example.

In FIG. 2 are represented by way of a block diagram showing the major elements, the embodiments of two stations 2 and 3, between which also other stations can be located, naturally, and by means of which elements the simultaneous mutual information transfer through the same data channel is possible. The two stations basically have the same structure, so that only the structure of station 2 will be further described hereinbelow.

It comprises a processing arrangement 20 that produces its own information to be transferred through line 21 and processes the information received through line 27. The line 21 leads to an exclusive OR gate 22 whose further input is coupled to the incoming write line 8a. The output signal from the exclusive OR gate 22 is combined by means of components not shown in the diagram with a clock signal which is produced by the processing arrangement 20 and applied through the line 23, and the clocked output signal is supplied over the outgoing write line 8b. The information on the line 21 is further applied to a memory 24 and there, with the clock signal, written onto the line 23. This memory 24 is appropriately a so-called FIFO memory, which supplies to the line 29 through the line 25 the written information in the same order as it was written, at a read clock which is independent of the write clock.

The line 25 leads to the one input of a further exclusive-OR gate 26, whose second input is coupled to the ingoing read line 9b, and the output signal of the exclusive OR gate 26 is fed to the processing unit 20 through the line 27. There is further provided a clock generator 28 that from the information on the read line 9b again produces the data clock and supplies as a clock signal through the line 29, which leads not only to a memory 24 but also to the processing arrangement 20.

The station 3 substantially has the same structure as the station 2, in which the processing arrangement 30 is equal to the processing arrangement 20, the line 31 to the line 21 etc.

Now it is assumed that the two stations simultaneously wish to exchange a data word, specifically: station 2 to station 3 the data word 01100110 and station 3 to station 2 the data word 11110000.

It is further assumed that a data channel for this data exchange has already been allocated according to prior art methods. On the incoming write line 8a of station 2 this data channel is still empty, that is to say it comprises, for example, only zeroes. When they are linked with the information to be transferred through line 21, in the exclusive OR gate 22 the following is provided:

| incoming write line 8a | 00000000 |
| data word on line 21 | 01100110 |
| outgoing write line 8b | 01100110 |

This information at the station 3 now arrives at the one input of the exclusive OR gate 32 and is linked to the data on the line 31:

| incoming write line 8b | 01100110 |
| data word on line 31 | 11110000 |

| outgoing write line 8c | 10010110 |

So this is the information or data word on the write line 8c in the associated data channel, and this data word is switched to the read line in the way described hereinbefore and thus appears on the incoming read line 9c of station 3, which is connected to the input of the exclusive OR gate 36. Its second input receives via the line 35 from the memory 34 the information to be transferred that appeared on line 31 at a previous instant, so that the following result is obtained:

| incoming read line 9c | 10010110 |
| data word on line 35 | 11110000 |
| data word on line 37 | 01100110 |

In this way the data word transferred by station 2 is applied to the processing arrangement 30 through this line 37.

The data word arriving through he read line 9c is now also available in an unchanged version on the incoming read line 9b of station 2 and is there applied to the one input of the exclusive OR gate 26, whose second input receives from memory 24 through the line 25 the data word transferred previously by the station 2, so that the following result is obtained:

| incoming read line 9b | 10010110 |
| data word on line 25 | 01100110 |
| data word on line 27 | 11110000 |

In this way the data word transferred by the station 3 is applied to the processing arrangement 20 through line 27.

Thus, in this way two data words are transferred simultaneously through a single data channel.

If now, in another case, only from station 3 to station 2 a data word has to be transferred, without station 2 wishing to transfer information, the exclusive OR gate 22 receives only zeroes through line 21, so that there will be only zeroes on the write line 8b at the station 3 in the data channel provided for the data transfer, and therewith the information supplied via line 31 is transferred unchanged through the outgoing write line 8c of station 3. Similarly, this information arrives at the station 2 through the incoming read line 9b and is there combined with the zeroes from line 25 in the exclusive OR gate 26, so that the information received on the read line 9b is supplied unchanged to the processing arrangement 20 through the line 27. This shows that owing to the respective exclusive OR gates 22 and 26, 32 and 36, etc., the normal data transfer in which only one station transfers data words in one data channel, is not affected.

What is claimed is:

1. A method for simultaneously transferring information through the same channel between two of two or more stations, which are all connected to each other for serial data transfer by means of a write line and a read line separated from the write line, the write line, after passing through all the stations, being connected to the read line at the end, comprising at each of these two stations: reversibly linking the information to be transferred with information arriving through an incoming write line; transferring the linked information through an outgoing write line; buffering the information to be transferred; and linking the information received through the read line to the buffered information, in order to receive the information to be transferred from the other station.

2. A method as claimed in claim 1, wherein the linking steps comprise performing an exclusive OR operation.

3. An arrangement for implementing the method as claimed in claim 1 or 2, comprising in each station; first linking means; an incoming write line connected to an output of said first means, and a second input of said first linking means connected to a source (20) of its own information to be transmitted, and an output of said first linking means connected to an outgoing write line (8b); and wherein at each 4. An arrangement as claimed in claim 3, characterized in that the first and the second linking arrangements (22, 26) are exclusive OR gates.

5. A method for simultaneously transferring information between two of a plurality of stations along separate read lines and write lines passing through all the stations comprising:
   transmitting a first data signal on said write line from a first station;
   reversibly linking a second data signal to said first data signal on said write line at a second station to produce a composite signal on the write line;
   buffering the second data signal in the second station;
   coupling said composite data signal to said read line; and
   linking the buffered second data signal to said composite data signal on said read line to recover said first data signal at said second station.

6. The method of claim 5 in which each of said reversibly linking step and said linking step comprise performing an exclusive OR operation.

7. Apparatus for simultaneously transferring information between a plurality of stations along separate read and write lines passing through all the stations comprising:
   means in first one of said two stations for transmitting a first data signal on said write line;
   linking means in a second one of said two stations connected to said write line for reversibly linking a second data signal to said first data signal on said write line to form a composite signal on said write line;
   buffer means in said second station for buffering said second data signal;
   means for coupling said composite signal from said write line to said read line; and
   unlinking means in said second station coupled to said buffer means and said read line for linking said buffered second signal to the composite signal on said read line to recover the first data signal.

8. The apparatus of claim 7 in which said linking means and said unlinking means comprise exclusive OR gates.

* * * * *